(12) United States Patent
Dacey (10) Patent No.: US 8,414,300 B2
(45) Date of Patent: Apr. 9, 2013

(54) FOLDABLE PRODUCT WITH FOLD LINES THAT ARE PARTLY PROVIDED WITH CREASES AND PARTLY BY LINES OF PERFORATIONS

(75) Inventor: Derek Dacey, Winford (GB)

(73) Assignee: Compass Maps Limited, Bristol (GB)

( * ) Notice: Subject to any disclaimer, the term of this patent is extended or adjusted under 35 U.S.C. 154(b) by 0 days.

(21) Appl. No.: 10/486,963

(22) PCT Filed: Aug. 14, 2002

(86) PCT No.: PCT/GB02/03766
§ 371 (c)(1),
(2), (4) Date: Aug. 12, 2004

(87) PCT Pub. No.: WO03/017235

PCT Pub. Date: Feb. 27, 2003

(65) Prior Publication Data

US 2004/0251678 A1    Dec. 16, 2004

(30) Foreign Application Priority Data

Aug. 14, 2001 (GB) .................................. 0119809.2

(51) Int. Cl.
*G09B 29/00* (2006.01)
(52) U.S. Cl. ..................................... 434/150
(58) Field of Classification Search .................. 434/150; 446/487, 488; 40/904; 283/34, 35
See application file for complete search history.

(56) References Cited

U.S. PATENT DOCUMENTS

| 3,753,558 | A |   | 8/1973  | Sheroff et al.          |
|-----------|---|---|---------|-------------------------|
| 4,502,711 | A | * | 3/1985  | Muth ................ 281/5 |
| 4,636,192 | A |   | 1/1987  | Vogtlander et al.       |
| 4,826,212 | A | * | 5/1989  | Muth et al. ........ 283/34 |
| 4,917,405 | A |   | 4/1990  | Muth et al.             |
| 5,217,257 | A | * | 6/1993  | Knoors ............. 283/34 |
| 5,417,641 | A | * | 5/1995  | Warren ............ 493/405 |
| 5,454,644 | A |   | 10/1995 | Augustin                |
| 5,843,262 | A | * | 12/1998 | Rosendale et al. .... 156/227 |
| 6,315,632 | B1 | * | 11/2001 | Gibbons et al. ...... 446/488 |

FOREIGN PATENT DOCUMENTS

| DE | 856964 C     |   | 11/1952 |
|----|--------------|---|---------|
| DE | 197 27 844   | * | 1/1999  |
| DE | 19727844 A1  |   | 1/1999  |
| GB | 649841       |   | 2/1951  |
| GB | 2322221 A    |   | 8/1998  |
| JP | 64-26768 U   |   | 2/1989  |
| JP | 1-85771 U    |   | 6/1989  |
| JP | 07-025181 A  |   | 1/1995  |
| JP | 3024162 U    |   | 2/1996  |
| JP | 10-024671 A  |   | 1/1998  |
| JP | 3053344 U    |   | 8/1998  |
| JP | 3073982 U    |   | 9/2000  |

OTHER PUBLICATIONS

English Language Translation of German Document DE 197 27 844 A1, (Nov. 2006).

(Continued)

*Primary Examiner* — Kurt Fernstrom
(74) *Attorney, Agent, or Firm* — Finnegan, Henderson, Farabow, Garrett & Dunner LLP (57) ABSTRACT

There is provided a foldable product, such as a map, which is formed from a sheet (10) of material such as stiff paper. The sheet (10) has predetermined folded and unfolded configurations by virtue of a predetermined pattern of fold lines (12, 13, 14, 19, 20, 23, 24). The fold lines are provided partly by creases and partly by lines of perforations depending on the stress in a particular area during folding and unfolding.

20 Claims, 3 Drawing Sheets

OTHER PUBLICATIONS

International Search Report in International Application No. PCT/GB02/03766 mailed Jan. 28, 2003 (5 pages).
Written Opinion in International Application No. PCT/GB02/03766 mailed Aug. 26, 2003 (5 pages).
International Preliminary Examination Report in International Application No. PCT/GB02/03766 dated Jan. 21, 2004 (5 pages).
Interlocutory Decision in Opposition Proceedings in European Patent No. EP 1 417 665 dated Apr. 29, 2011 (33 pages).

* cited by examiner

FOLDABLE PRODUCT WITH FOLD LINES THAT ARE PARTLY PROVIDED WITH CREASES AND PARTLY BY LINES OF PERFORATIONS

The present invention relates to a foldable product formed from a sheet of material adapted to be unfolded and folded repeatedly during use simply by opening and closing a cover, and is concerned in particular but not exclusively with a foldable map.

It is known to provide many forms of foldable products of sheet material such as stiff paper which require to be folded and unfolded repeatedly in use, for example foldable maps. Commonly in a simple form of foldable map, the map is rectangular, and is folded along one or more longitudinal fold lines extending along the length of the map, and then is cross-folded across one or more transverse fold lines, which are transverse to the length of the map. The present invention is particularly, but exclusively, concerned with a more complicated form of folding map, known as a star-folded map, where a series of inward and outward folds are made, principally along fold lines meeting at a centre point of the sheet, but also including secondary fold lines positioned towards the edges of the sheets. The arrangement is such that when the map is folded to a predetermined folded condition, two principal portions of the sheet are closed one onto the other by a closing movement in the manner of the closing of the covers of a book, and other portions of the map are automatically folded inwardly so as to be enclosed between the two closed principal portions of the sheet. In this way the map may be folded to an area much smaller than the open map, and can be folded by a single closing movement similar to closing the covers of a book. An example of such a star-folded map sheet is disclosed in U.S. Pat. No. 4,636,192.

In manufacturing a foldable product such as a star-folded map the sheet is provided with a predetermined pattern of fold lines defining the lines along which the product is to be folded. Traditionally this is done by providing simple score or crease lines on the sheet. After the fold lines have been formed on the sheet, the product is folded for the first time, either manually or by machine, to produce the commercial product. However simple scoring or creasing of the fold lines often results in significantly less precise fold lines than are commercially acceptable, as well as requiring a long production finishing time due to the requirement of ensuring the fold line is pressed completely flat. If the score or crease line is not finished flat with a sharp edge, the paper fold tends to collapse along the line, resulting in a damage to the paper when the cover is closed.

An alternative which is used sometimes is to perforate along the entire fold line. While this enables a more accurate fold to be obtained as will the use of a thicker paper, a disadvantage arises as the perforated line will often split due to significant stress occurring as the paper sheet is opened.

It is an object of the present invention to provide an improved foldable product which eliminates or reduces the problem of paper tear by perforation, and enables a faster production time than is provided by scoring or creasing the paper.

According to the present invention there is provided a foldable product formed from a sheet of material, comprising: a sheet of material adapted to be folded and unfolded repeatedly during use between a predetermined folded configuration and a predetermined unfolded configuration, the sheet bearing a predetermined pattern of fold lines defining the lines along which the product is to be folded, in which the fold lines are partly provided by creases and partly by lines of perforations, the creases being positioned at locations subject to greater stress during folding and unfolding of the product.

In preferred arrangements of the present invention, at least some of the fold lines radiate outwardly from a generally central point of the sheet, and each outwardly radiating fold line has a creased portion and a perforated portion, the creased portion being located at a proximal portion of the fold line, extending outwardly from the central point. Also in preferred arrangements, at least some of the fold lines extend from an edge of the sheet, and each such fold line includes a creased portion and a perforated portion, the creased portion of the said extending fold line being located to extend from the said edge of the sheet along the fold line.

The invention finds particular application in a foldable product of the so-called star-folded form, in which the predetermined unfolded configuration comprises the sheet lying substantially flat and the predetermined folded configuration comprises two principal portions of the sheet being closed one onto the other by a closing movement about a principal axis of the sheet in the manner of closing the covers of a book. The fold lines of the sheet define inward and outward rectilinear folds when the product is folded to the predetermined folded configuration, the said inward folds extending inwardly relative to the closure of the principal portions together, and the said outward folds extending outwardly relative to the closure of the two principal portions together. The fold lines of the sheet define the fold lines of the sheet defining four principal outward folds meeting at a generally central point of the sheet and arranged as opposed pairs of outward folds, and two principal inward folds meeting at the central point of the sheet and arranged as an opposed pair of inward folds. Each principal outward fold divides at its distal end into two edge outward folds which diverge from the direction of the associated principal outward fold and extend to respective edges of the sheet. Each said distal end of a principal outward fold has an edge inward fold extending therefrom along the same direction as the direction of the associated principal outward fold and extending to an edge of the sheet.

In such a star-folded product it is preferred that each fold line which defines a principal outward fold has a creased portion and a perforated portion, the creased portion extending from the centre (M) along the fold line and the perforated portion extending from the distal end of the principal outward fold along the fold line. Preferably the creased portion of the fold line of the principal outward fold extends along a distance in the range 25% to 30% of the length of the principal outward fold, preferably approximately 27%.

It is preferred that each fold line which defines a principal inward fold has two creased portions and a perforated portion, the creased portion extending from the centre (M) along the fold line, the creased portion extending from an edge of the sheet along the fold line, and the perforated portion extending along a middle portion of the fold line. Preferably the creased portion which extends from the edge of the sheet, extends along a distance in the range 3% to 6% of the length of the principal inward fold, preferably approximately 4%. It is also preferred that the creased portion of the fold line of the principal inward fold which extends from the central point of the sheet, extends along a distance in the range 10% to 15% of the length of the principal inward fold, preferably 11%.

It is also preferred that each fold line which defines an edge outward fold has a creased portion and a perforated, the creased portion extending from an edge of the sheet along the fold line and the perforated portion extending from the distal end of the principal outward fold along the fold line. Preferably the creased portion of the fold line of the edge outward fold extends along a distance in the range 5% to 15% of the length of the edge outward fold, preferably approximately 10%.

Furthermore it is preferred that each fold line which defines an edge inward fold has two creased portions and two perforated portions, one perforated portion extending from the centre distal end of the principal outward fold along the fold line, one creased portion extending from an edge of the sheet along the fold line, and the second perforated portion and the second creased portion extending along a middle portion of the fold line. Preferably the creased portion which extends from the edge of the sheet, extends along a distance in the range 5% to 10% of the length of the edge inward fold, preferably approximately 8%. Also preferably the creased portion of the fold line of the principal inward fold which extends from the central point of the sheet, extends along a distance in the range 10% to 15% of the length of the principal inward fold, preferably approximately 16%.

To summarise, overall it is preferred that in a star-folded form of foldable product embodying the invention, each creased portion of each fold line extends along a distance in the range 3% to 30% of the length of the respective fold line.

It is to be appreciated that the invention may be applied to many forms of foldable product, whether star-shaped or having folds all aligned to rectangular sides of a sheet. Also the outer perimeter of the sheet may be different from the conventional rectangular shape, and may for example be curved. However the invention has particular application in a star-folded foldable product of the kind set out, in which the sheet is substantially rectangular having one pair of opposed sides longer than the other opposed pair of sides, the said principal axis of the sheet being positioned at right angles to the longer sides thereof, and the opposed pair of inward folds also being arranged at right angles to the longer sides of the rectangle. In such an arrangement it is preferred that each edge outward fold extends from its associated distal end point of the associated outward fold, to an associated edge of the sheet, at right angles to the associated edge. Also preferably each principal outward fold extends outwardly from the centre point of the sheet in a direction subtending 45° to the next adjacent inward fold.

In general, the invention finds particular use where the sheet has an information bearing face on the side of the sheet facing inwardly upon closure of the two principal portions of the sheet. In such a product, it may be arranged that portions of the other side of the sheet are secured to a backing sheet of material stiffer than the first mentioned sheet, such that upon closure of the stiff outer sheet by folding about the principal axis, the said principal portions are brought together in the manner of a book, while other portions of the sheet are free to fold about the said fold lines in such a manner that upon closure of the product the folded sheet is substantially entirely contained within the folded stiff outer sheet within an area substantially equal to the said principal portions.

Embodiments of the invention, at least in preferred forms, may be arranged to provide a combination of the advantages of a known form of foldable product where the fold lines are entirely creased, and of known forms of foldable product where the fold lines are entirely perforated. In accordance with the present invention, by selecting particular locations in which the creased portions are provided, it is possible to provide the combined advantages of the previous systems. The locations of the creased or scored portions are determined by the areas of higher stress, where tearing is more likely to occur during repeated use of the product.

It is to be appreciated that the terms "creased fold line" and "scored fold line" are synonymous, and that both forms of fold line are encompassed by the use of the term "creased" in the present specification.

Embodiments of the invention will now be described by way of example with reference to the accompanying drawings in which.

Referring firstly to FIGS. 1 to 4, there is shown a foldable product of the kind disclosed in U.S. Pat. No. 4,636,192. In this prior disclosure there is described, as shown particularly in FIG. 1, a sheet 10 of stiffened paper or other suitable material, which is to be folded to the shape of the area of the shaded area F, and to this end is provided with outward and inward folds along fold lines indicated in FIG. 1.

Figure 1:
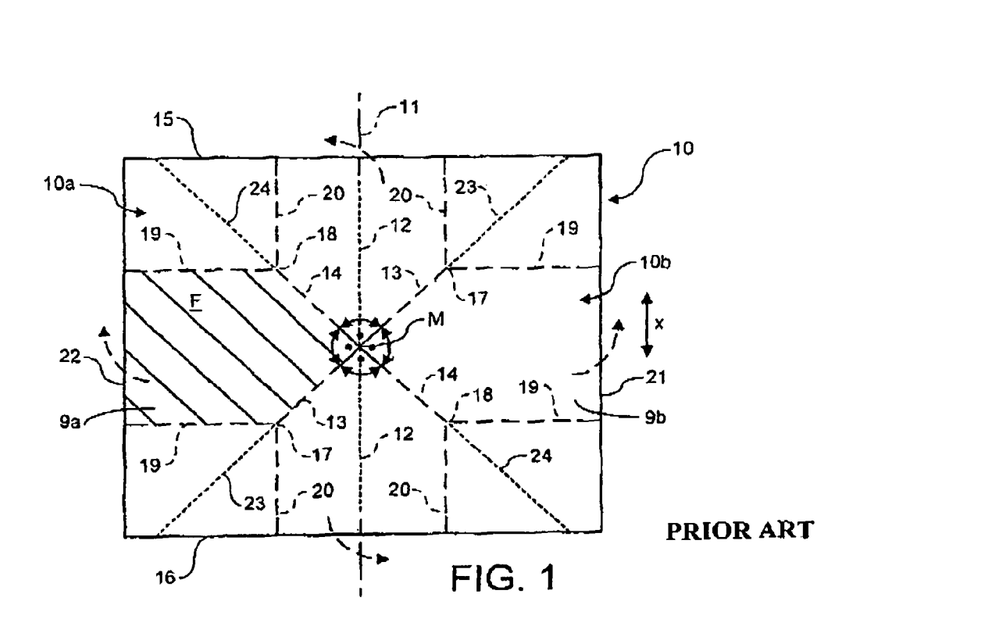
FIG. 1 shows a sheet of material forming a foldable product of known form, the sheet being laid out in a predetermined unfolded configuration, the sheet being perforated on the lines of the intended folds.

Referring to FIG. 1, the sheet 10 bears a number of fold lines which are indicated by dotted lines and dashed lines, and are formed by a line of closely packed perforations or cuts in each case. Fold lines which give rise to inward folds are indicated by dotted lines, and fold lines which give rise to outward folds are indicated by dashed lines. The fold lines are such that inward and outward folds are formed such that the sheet can be folded together when two halves of the sheet 10, indicated at 10a and 10b, are folded together along a central axis. 11 in the manner of a book. In this closing movement, two principal portions of the sheet, indicated at 9a and 9b, are folded one on top of the other, and the remaining parts of the sheet become folded inwardly so as to be entirely folded within the area indicated by the shaded area F.

Figure 2:
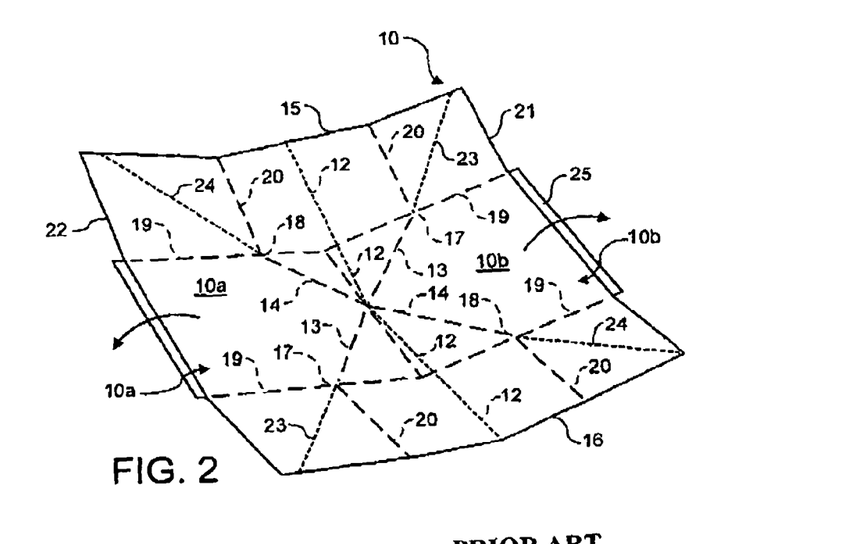
FIG. 2 shows the known foldable sheet of FIG. 1 when glued into a cover sheet, and when partially moved from the unfolded configuration to the folded configuration.

As shown in particular in FIGS. 1 and 2, the sheet 10 has at its centre two principal inward folds 12 that extend in a direction indicated by X and meet at a generally central point M, and four principal outward folds 13 and 14 which also meet at the centre point M. The principal outward folds 14, 14 are aligned opposite each other, at 45° to the inward folds 12, 12, and the principal outward folds 13 are similarly aligned, and are at right angles to the outward folds 14. The outward folds 13 and 14 are directed approximately towards the corners of the sheet and intersect its long edges 15 and 16 at a short distance from the corners.

Each principal outward fold 13, 14 divides at its distal end 17, 18 into two edge outward folds 19, 20 which diverge from the direction of the associated principal outward fold 13, 14 and extend to respective edges of the sheet 10. Each distal end 17, 18 of a principal outward fold 13, 14 has an edge inward fold 23, 24 extending therefrom along the same direction as the direction of the associated principal outward fold 13, 14. Each edge inward fold 23, 24 extends to an edge of the sheet 10, indicated at 15 or 16.

Figure 3:
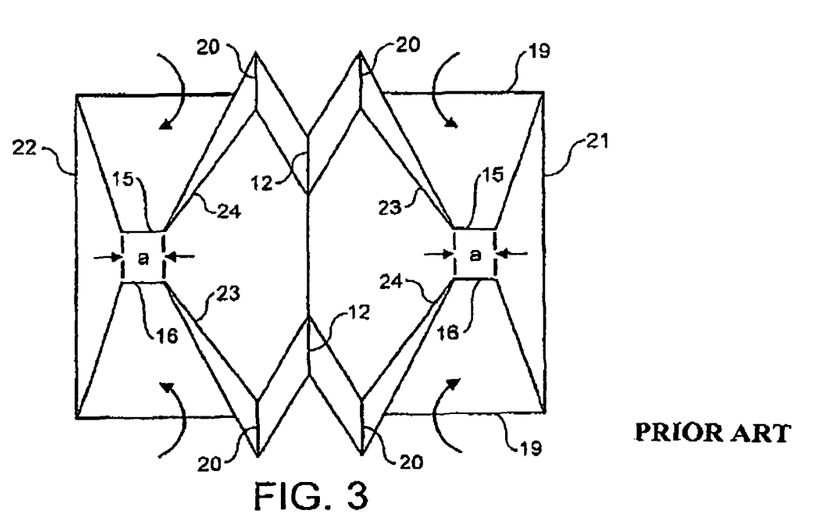
FIG. 3 is a plan view of the sheet of FIG. 1, when positioned mid-way between the unfolded and folded configuration.
Figure 4:
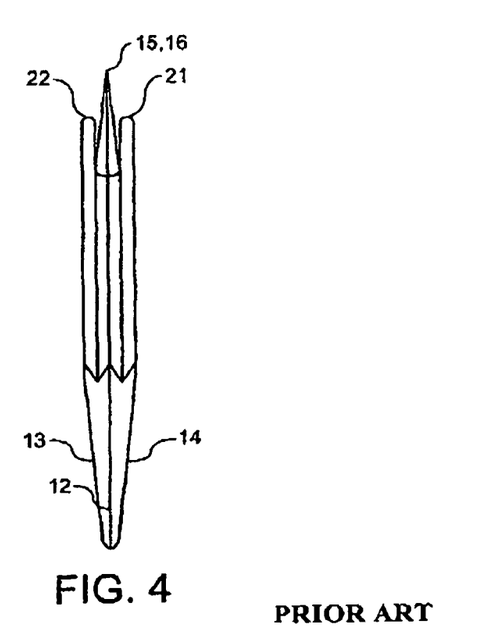
FIG. 4 is a perspective view of the folded sheet of the previous Figures, folded together with principal portions of the sheet lying one on top of the other, viewed from the front.

As shown in FIG. 2, the sheet 10 is secured to a stiff backing or binding sheet 25 comprised of two halves which may be closed together in the form of a book. The sheet 10 is attached to the backing sheet 25 at spaced apart portions located on the rear side of the principal portions 9a and 9b of the sheet. Other areas of the sheet 10 are free to move, and in particular the centre point M is not secured to the backing sheet 25, but is free to allow the inward movement of the inward folds 12 during closure. FIG. 3 shows further movement of the foldable product towards complete closure, and FIG. 4 shows complete closure of the product.

Figure 5:
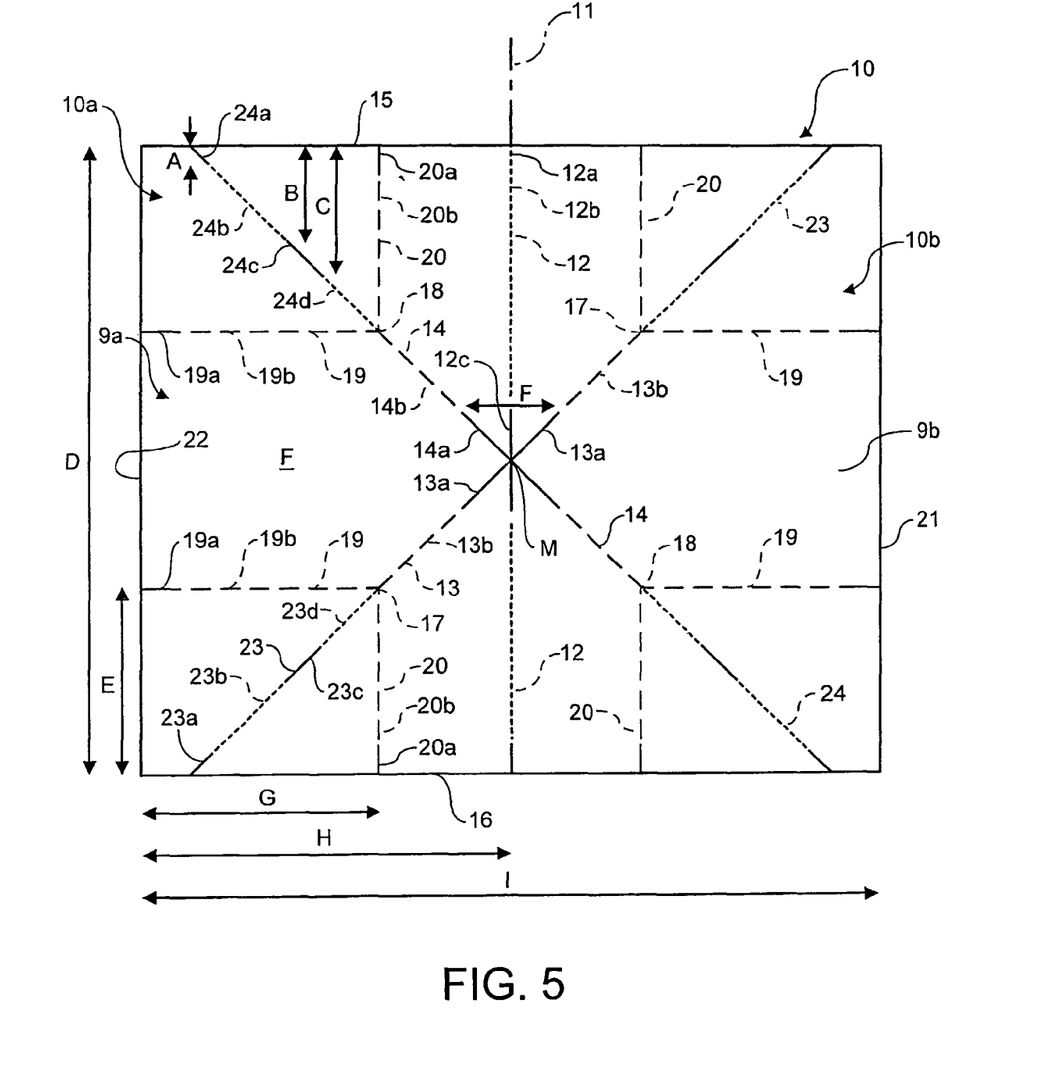
FIG. 5 is a plan view of a sheet of a foldable product, corresponding generally to the view of the prior art in FIG. 1, but embodying the present invention.

Referring now to FIG. 5, there is shown an embodiment of the present invention, which corresponds generally to the product shown in FIG. 1 of the known arrangement, except for the formation of the fold lines. Components and features which are common to the embodiment of the present invention in FIG. 5, and the known arrangement of FIG. 1, are indicated by like reference numerals. In FIG. 5, again inward folds are indicated by dotted lines and outward folds are indicated by dashed lines. However in FIG. 5, the dotted lines and dashed lines specifically indicate perforations, and the fold lines further included solid lines, which indicate non-perforated creased or scored fold lines. In the diagrammatic representation of FIG. 5, the significance of the dotted and dashed lines is merely to indicate inward or outward perforated folds, and specifically does not indicate the density or shape of the perforations.

Considering the arrangement of FIG. 5 in detail, each fold line which defines a principal outward fold 13 has a creased portion 13a and a perforated portion 13b, the creased portion 13a extending from the centre M along the fold line towards an edge or corner of the sheet 10. The perforated portion 13b extends from the end of the creased portion 13a, to the distal end 17 of the principal outward fold 13. Similarly, each principal outward fold 14 is composed of a creased portion 14a leading from the centre M, and a perforated portion 14b extending from the end of the creased portion 14a to the distal end 18 of the principal outward fold 14.

Each fold line which defines a principal inward fold 12 has two creased portions 12a and 12c and a perforated portion 12b. The creased portion 12c extends from the centre M along the fold line and the creased portion 12a extends from an edge 15 or 16 of the sheet 10 along the fold line towards the centre M. The perforated portion 12b extends along a middle portion of the fold line, joining the creased portions 12a and 12c.

Each fold line which defines an edge outward fold 19 has a creased portion 19a and a perforated portion 19b, the creased portion 19a extending from an edge 22 of the sheet along the fold line and the perforated portion 19b extending from the distal end 17 or 18 of the principal outward fold 13 or 14 along the fold line. Similar creased and perforated portions are provided at the other edge outward folds 20.

Each fold line which defines an edge inward fold 23 has two creased portions 23a and 23c and two perforated portions 23b and 23d. One perforated portion 23d extends from the distal end 17 of the associated principal outward fold 13 along the fold line. The creased portion 13a extends from an edge 15 or 16 of the sheet 10 along the fold line inwardly towards the centre M. The second perforated portion 23b and the second creased portion 23c extend along a middle portion of the fold line, alternately with the creased and perforated portions 23a and 23d.

Various exemplary dimensions of the product are shown on the drawing labelled A to I, and may be as set out in the following table.

| A | 5 mm |
| B | 26 mm |
| C | 38 mm |
| D | 215 mm |

-continued

| E | 64 mm |
| F | 25 mm |
| G | 81 mm |
| H | 125 mm |
| I | 250 mm |

As a generally preferred exemplary range for the creased portions of the fold lines, it is preferred that each creased portion of each fold line extends along a distance in the range 3% to 30% of the length of the respective fold line. Particularly preferred ranges and examples of the proportions of the creased and perforated parts of the fold lines, may conveniently be as has been set out in the introduction of this specification.

The selection of the portions of the fold lines which are creased or scored, in proportion to the extent of the fold lines which are perforated, is selected so that the creased or scored portions are positioned at locations subject to greater stress during folding and unfolding of the product, that is to say areas which are found in the prior art examples to be most likely to allow tearing of the product.

Advantages of the embodiment of the invention shown, combining perforated and scored or creased fold lines, include reducing the time required for producing the product, especially when produced manually, significantly reducing damage occurring to the product in use, and extending the usefulness and the effectiveness of the product, and finally increasing the life of each folded product.

The invention claimed is:

1. A foldable product formed from a sheet of paper, comprising:
   a sheet of paper adapted to be folded and unfolded repeatedly during use between a single predetermined folded configuration and a predetermined unfolded configuration in which the sheet lies substantially flat;
   the sheet bears a predetermined pattern of fold lines defining the lines along which the product is to be folded;
   the fold lines are partly provided by creases and partly by lines of perforations;
   the sheet comprises two principal portions which are closed one on to the other by a closing movement about a principal axis of the sheet in the manner of closing the covers of a book;
   the fold lines of the sheet define:
      four principal outward folds meeting at a generally central point of the sheet and arranged as opposed pairs of outward folds,
      two principal inward folds meeting at the central point of the sheet and arranged as an opposed pair of inward folds, and
      an edge inward fold and two edge outward folds at a distal end of each principal outward fold, the edge inward fold and edge outward folds extending to edges of the sheet;
   creased portions of each respective principal outward fold and creased portions of each respective principal inward fold meet at a central intersection of creased portions located at the generally central point of the sheet; and
   perforated portions of the principal outward fold, the edge inward fold, and the two edge outward folds at the distal end of each of the principal outward folds form an intersection of perforated portions,
   wherein the edge inward fold includes a middle creased portion extending along a middle portion of the edge inward fold between the perforated portion of the edge inward fold and another perforated portion of the edge inward fold.

2. The product according to claim 1, wherein:
the creased portions meeting at the central intersection are first creased portions; and
each of the edge inward fold and edge outward folds includes a second creased portion extending from one of the edges of the sheet.

3. The product according to claim 1, wherein each fold line is folded in a single predetermined direction to fold the sheet of paper into the single predetermined folded configuration.

4. The product according to claim 1, wherein the product consists of only paper.

5. A foldable product formed from a sheet of paper, the foldable product comprising:
a sheet of paper adapted to be folded and unfolded repeatedly during use between a single predetermined folded configuration and a predetermined unfolded configuration in which the sheet lies substantially flat, the sheet bearing a predetermined pattern of fold lines defining the lines along which the product is to be folded, and the sheet comprising two principal portions which are closed one on to the other by a closing movement about a principal axis of the sheet in the manner of closing the covers of a book;
wherein the fold lines of the sheet are partly provided by creases and partly by lines of perforations, and the fold lines define:
four principal outward folds meeting at a generally central point of the sheet and arranged as opposed pairs of outward folds,
two principal inward folds meeting at the central point of the sheet and arranged as an opposed pair of inward folds, and
an edge inward fold and two edge outward folds at a distal end of each principal outward fold, the edge inward fold and the edge outward folds extending to edges of the sheet;
each of the principal outward folds and each of the principal inward folds includes a first creased portion, the first creased portions of the principal outward folds and the principal inward folds meeting at a central intersection of creased portions located at the generally central point of the sheet, and
each of the principal outward folds includes a first perforated portion extending from the distal end of the principal outward folds;
each of the edge inward folds and each of the edge outward folds includes:
a second creased portion extending from one of the edges of the sheet, and
a second perforated portion extending along the fold line so that the second perforated portions of the edge inward fold and the two edge outward folds at the distal end of each of the principal outward folds form an intersection of perforated portions; and
each of the edge inward folds includes a third creased portion extending along a middle portion of the fold line and separated from the second creased portion by a third perforated portion.

6. The product of claim 5, wherein the third creased portion of each edge inward fold extends between the third perforated portion and the second perforated portion of the respective edge inward fold.

7. A foldable product formed from a sheet of paper, the foldable product comprising:
a sheet of paper adapted to be folded and unfolded repeatedly during use between a single predetermined folded configuration and a predetermined unfolded configuration in which the sheet lies substantially flat;
the sheet bears a predetermined pattern of fold lines defining the lines along which the product is to be folded;
the fold lines are partly provided by creases and partly by lines of perforations;
the sheet comprises two principal portions which are closed one on to the other by a closing movement about a principal axis of the sheet in the manner of closing the covers of a book;
the fold lines of the sheet define:
four principal outward folds meeting at a generally central point of the sheet and arranged as opposed pairs of outward folds,
two principal inward folds meeting at the central point of the sheet and arranged as an opposed pair of inward folds, and
an edge inward fold and two edge outward folds at a distal end of each principal outward fold, the edge inward fold and edge outward folds extending to edges of the sheet;
creased portions of each respective principal outward fold and creased portions of each respective principal inward fold meet at a central intersection of creased portions located at the generally central point of the sheet; and
perforated portions of the principal outward fold and the edge inward fold at the distal end of each of the principal outward folds meet at an intersection of the respective principal outward fold, the respective edge inward fold, and the respective edge outward folds,
wherein the edge inward fold includes a middle creased portion extending along a middle portion of the edge inward fold between the perforated portion of the edge inward fold and another perforated portion of the edge inward fold.

8. A product according to claim 7, wherein the creased portion of each principal outward fold extends along a distance in the range 25% to 30% of the length of the principal outward fold.

9. A product according to claim 7, wherein each principal inward fold includes a creased portion that extends from one of the edges of the sheet and along a distance in the range 3% to 6% of the length of the principal inward fold.

10. A product according to claim 7, wherein the creased portion of each principal inward fold which extends from the generally central point of the sheet, extends along a distance in the range 10% to 15% of the length of the principal inward fold.

11. A product according to claim 7, wherein each edge outward fold includes a creased portion that extends along a distance in the range 5% to 15% of the length of the edge outward fold.

12. A product according to claim 7, wherein each edge inward fold includes a creased portion that extends from one of the edges of the sheet and along a distance in the range 5% to 10% of the length of the edge inward fold.

13. A product according to claim 7, wherein each creased portion of each fold line extends along a distance in the range 3% to 30% of the length of the respective fold line.

14. A product according to claim 7, wherein the sheet is substantially rectangular having one pair of opposed sides longer than the other opposed pair of sides, the principal axis of the sheet being positioned at right angles to the longer side thereof, and the opposed pair of principal inward folds being arranged at right angles to the longer sides of the rectangle.

15. A product according to claim 14, wherein each edge outward fold extends from its associated distal end point of the associated outward fold, to an associated edge of the sheet, at right angles to the associated edge.

16. A product according to claim 14, wherein each principal outward fold extends outwardly from the centre point of the sheet in a direction subtending 45° to the next adjacent inward fold.

17. A product according to claim 7, wherein the sheet of paper is a first sheet, portions of the first sheet are secured to a backing sheet of material stiffer than the first sheet, such that upon closure of the backing sheet by folding about the principal axis, the principal portions are brought together in the manner of a book, while other portions of the sheet are free to fold about the fold lines in such a manner that upon closure of the product the folded sheet is substantially entirely contained within the folded stiff outer sheet within an area substantially equal to the principal portions.

18. A product according to claim 7, wherein the sheet includes an information bearing surface facing inwardly upon folding of the foldable product, and the information bearing surface comprises a map.

19. The product according to claim 7, wherein each fold line is folded in a single predetermined direction to fold the sheet of paper into the single predetermined folded configuration, and the single predetermined direction is one of an inward direction or an outward direction.

20. The product according to claim 7, wherein the product consists of only paper.

* * * * *

UNITED STATES PATENT AND TRADEMARK OFFICE
CERTIFICATE OF CORRECTION

| | | |
|---|---|---|
| PATENT NO. | : 8,414,300 B2 | Page 1 of 1 |
| APPLICATION NO. | : 10/486963 | |
| DATED | : April 9, 2013 | |
| INVENTOR(S) | : Derek Dacey | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this
Eighteenth Day of June, 2013

Teresa Stanek Rea
*Acting Director of the United States Patent and Trademark Office*